(12) United States Patent
Branyon

(10) Patent No.: US 9,926,122 B1
(45) Date of Patent: Mar. 27, 2018

(54) LAMINATE STRUCTURE FOR RESEALABLE PACKAGE

(71) Applicant: SONOCO DEVELOPMENT, INC., Hartsville, SC (US)

(72) Inventor: Jacob Donald Prue Branyon, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 65 days.

(21) Appl. No.: 15/256,793

(22) Filed: Sep. 6, 2016

(51) Int. Cl.
| | | |
|---|---|---|
| *B65D 75/00* | (2006.01) |
| *B65D 75/26* | (2006.01) |
| *B65D 75/20* | (2006.01) |
| *B65D 75/58* | (2006.01) |
| *B32B 37/12* | (2006.01) |
| *B32B 27/32* | (2006.01) |
| *B32B 27/36* | (2006.01) |
| *B32B 7/12* | (2006.01) |
| *B23K 26/00* | (2014.01) |
| *B23K 26/53* | (2014.01) |
| *B23K 26/38* | (2014.01) |
| *B23K 26/402* | (2014.01) |
| *B23K 103/16* | (2006.01) |

(52) U.S. Cl.
CPC .......... *B65D 75/26* (2013.01); *B23K 26/0057* (2013.01); *B23K 26/38* (2013.01); *B23K 26/402* (2013.01); *B23K 26/53* (2015.10); *B32B 7/12* (2013.01); *B32B 27/32* (2013.01); *B32B 27/36* (2013.01); *B32B 37/12* (2013.01); *B65D 75/20* (2013.01); *B65D 75/5838* (2013.01); *B23K 2203/172* (2015.10); *B32B 2323/04* (2013.01); *B32B 2323/10* (2013.01); *B32B 2367/00* (2013.01); *B32B 2553/00* (2013.01)

(58) Field of Classification Search
CPC ........................... Y10T 428/15; B65D 75/585; B65D 75/5805; B65D 75/5833; B65D 75/5838; B65D 75/5844
See application file for complete search history.

(56) References Cited

U.S. PATENT DOCUMENTS

| | | |
|---|---|---|
| 9,079,698 B2 | 7/2015 | Safarik |
| 9,174,308 B2 | 11/2015 | Chow et al. |
| 2003/0231811 A1 | 12/2003 | Hodson et al. |
| 2010/0247822 A1 | 9/2010 | Ziolkowski et al. |
| 2013/0320019 A1 | 12/2013 | Tinoco et al. |

*Primary Examiner* — Alexander Thomas
(74) *Attorney, Agent, or Firm* — Nelson Mullins Riley & Scarborough, LLP

(57) ABSTRACT

A laminate structure, package, and associated method of manufacturing are described, where the laminate structure includes a first film layer having an uncut laser-distorted region, a second film layer having an inner laser score line laminated to the first film layer, and a third film layer having an outer score line laminated to the second film layer. The inner laser score line is in line with the laser-distorted region, and the outer score line is offset from the inner laser score line and the laser-distorted region. When a consumer peels back the third film layer via the outer score line, the first film layer breaks along the laser-distorted region to form a first film layer cut line continuous with the inner laser score line, allowing the first film layer and the second film layer to be moved together with the third film layer for opening the package.

20 Claims, 5 Drawing Sheets

LAMINATE STRUCTURE FOR RESEALABLE PACKAGE

BACKGROUND

The present disclosure relates generally to laminate structures for forming packaging for products, and more particularly to laminate structures having a continuous film layer for providing a hermetic seal in an unopened package while also having an easy open/reclose functionality.

Flexible film-based materials are commonly employed for constructing packages for products that are perishable, such as pharmaceutical and food products that must be protected against oxygen exposure and kept from either drying out (in the case of moist products such as cheese, or wet wipes) or from picking up moisture from the outside environment (in the case of dry products such as crackers or cookies). If the product is of the type that will be used little by little over time, then it may be desirable to provide a way to reclose the package after it is opened for the first time. Various configurations of film-based laminates and packages that are reclosable have been developed. Further improvements in such laminates and packages are desired.

BRIEF SUMMARY

Embodiments of the invention described herein provide improved laminate structures, packages formed from laminate structures, and methods for manufacturing laminate structures. The laminate structures provide a continuous film layer that forms a hermetic seal in unopened packages while still having the easy open/reclose functionality desired by consumers once opened.

Accordingly, embodiments of the invention provide a package formed using a laminate structure, the laminate structure comprising a first film layer, a second film layer, and a third film layer. The first film layer defines a first surface configured to be disposed proximate a product stored within the package and a second surface opposite the first surface. The first film layer also includes an uncut laser-distorted region. The second layer defines a first surface laminated to the second surface of the first film layer and a second surface opposite the first surface of the second film layer. The second film layer also includes an inner laser score line extending between the first and second surfaces of the second film layer. The third film layer defines a first surface laminated to the second surface of the second film layer and a second surface opposite the first surface of the third film layer. The third film layer also includes an outer score line extending between the first and second surfaces of the third film layer. The inner laser score line is in line with the laser-distorted region, and the outer score line is offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer. The outer score line may, in some embodiments, comprise an outer laser score line.

In certain embodiments, the second film layer may be laminated to the first film layer via a permanent adhesive. In some embodiments, the third film layer may be laminated to the second film layer via a pressure sensitive adhesive.

In some cases, the first film layer may comprise a polyethylene (PE). The second film layer may, in some embodiments, comprise a polyethylene terephthalate (PET), an oriented polypropylene (OPP), or any combination thereof. The PET, the OPP, or any combination thereof may be metallized. In some embodiments, the third film layer may comprise a PET, an OPP, or any combination thereof.

In other embodiments, a laminate structure is provided for forming a package. The laminate structure comprises a first film layer, a second film layer, and a third film layer. The first film layer defines a first surface configured to be disposed proximate a product stored within a package and a second surface opposite the first surface. The first film layer also includes an uncut laser-distorted region. The second layer defines a first surface laminated to the second surface of the first film layer and a second surface opposite the first surface of the second film layer. The second film layer also includes an inner laser score line extending between the first and second surfaces of the second film layer. The third film layer defines a first surface laminated to the second surface of the second film layer and a second surface opposite the first surface of the third film layer. The third film layer also includes an outer score line extending between the first and second surfaces of the third film layer. The inner laser score line is in line with the laser-distorted region, and the outer score line is offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer. The outer score line may, in some embodiments, comprise an outer laser score line.

In certain embodiments, the second film layer may be laminated to the first film layer via a permanent adhesive. In some embodiments, the third film layer may be laminated to the second film layer via a pressure sensitive adhesive.

In some cases, the first film layer may comprise a polyethylene (PE). The second film layer may, in some embodiments, comprise a polyethylene terephthalate (PET), an oriented polypropylene (OPP), or any combination thereof. The PET, the OPP, or any combination thereof may be metallized. In some embodiments, the third film layer may comprise a PET, an OPP, or any combination thereof.

In still other embodiments, a method of manufacturing a laminate structure for forming a package is provided. The method comprises laminating a first film layer to a second film layer, where the first film layer defines a first surface configured to be disposed proximate a product stored within a package. The first film layer further defines a second surface opposite the first surface and is continuous. The second film layer defines a first surface laminated to the second surface of the first film layer and a second surface opposite the first surface of the second film layer. The method further includes laminating the second surface of the second film layer to the third film layer, where the third film layer defines a first surface laminated to the second surface of the second film layer and a second surface opposite the first surface of the third film layer. The method also includes forming an outer score line in the third film layer extending between the first and second surfaces of the third film layer, and laser-cutting an inner laser score line in the second film layer extending between the first and second surfaces of the second film layer. The inner laser score line is made through the first film layer, where laser-cutting the inner laser score line creates a laser-distorted region in the first film layer. The inner laser score line is in line with the laser-distorted region, and the outer score line is offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer. The outer score line may, in some embodiments, comprise an outer laser score line. In this regard, forming the outer score line in the third film layer may, in some embodiments, comprise laser-cutting the third film layer from an outer side of the laminate structure to form the outer score line.

In some embodiments, laminating the first film layer to the second film layer may comprise applying a permanent adhesive between the first film layer and the second film layer. In further embodiments, laminating the second film layer to the third film layer may comprise applying a pressure sensitive adhesive between the second film layer and the third film layer.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
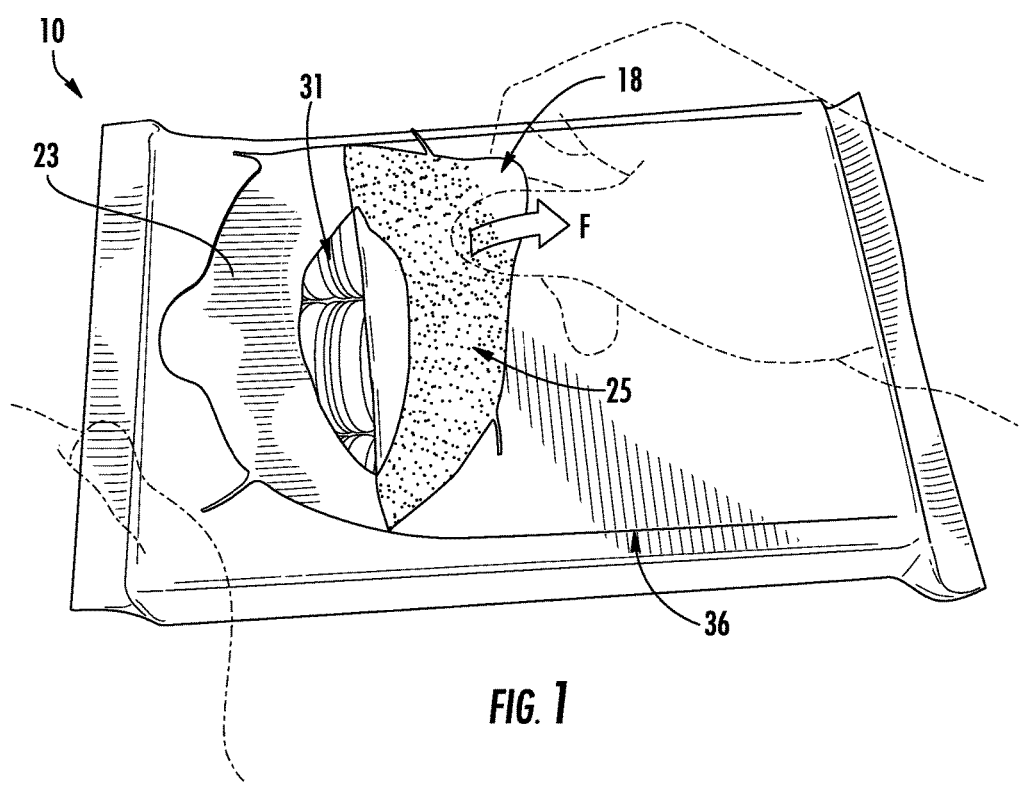
FIG. 1 is a perspective view of a package in a semi-open configuration formed using a laminate structure according to an example embodiment of the invention.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Conventional resealable packages made of flexible materials, such as various polymer-based materials, are often used to hold various food products, pharmaceutical products, chemical products, and consumer goods. Some conventional resealable packages provide removable portions that, when peeled off by a consumer, reveal resealable portions built-in to the packaging. In this regard, the consumer can open the package in a controlled manner to access the product and thereafter reseal the package to save any unused contents for later consumption.

Such packages may provide environmental protection for perishable products, but they are unable to provide a hermetic seal. Specifically, when the films used in conventional packages are scored from the top and/or bottom to define the removable portions, the scores create holes or pathways in the package that allow the ingress or egress of moisture and/or oxygen and have a negative impact on the overall barrier properties of the package. In this regard, such packages are unable to provide a sufficient seal (i.e. a hermetic seal) for products requiring modified atmosphere packaging and/or pharmaceutical products, where product protection is of increased concern.

Through applied effort, ingenuity, and innovation, many of these identified problems have been solved by the inventor. Accordingly, embodiments of the invention provide improved laminate structures, packages formed from laminate structures, and methods for manufacturing laminate structures, where the laminate structures include a continuous film layer that maintains a hermetic seal in unopened packages while still having the easy open/reclose functionality desired by consumers once the packages are opened. Moreover, the fracture of the first film layer (discussed in more detail below) may also provide benefits relating to tamper evidence and overall product protection.

In particular, embodiments of the laminate structure include a first film layer, a second film layer, and a third film layer. In some embodiments, the first, innermost film layer defines a first surface configured to be disposed proximate a product stored within a package and a second surface opposite the first surface and includes an uncut laser-distorted region. The second film layer may be an intermediate layer that defines a first surface laminated to the second surface of the first film layer and a second surface opposite the first surface of the second film layer. The second film layer may include an inner laser score line extending between the first and second surfaces of the second film layer. The third, outermost film layer may define a first surface laminated to the second surface of the second film layer and a second surface opposite the first surface of the third film layer. The third film layer may include an outer score line extending between the first and second surfaces of the third film layer. The inner laser score line may be in line with the laser-distorted region, and the outer score line may be offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer, as described below.

Embodiments of the invention described herein are applicable in, and may be embodied by, various kinds of packages including stand-up pouches, bags, sealed trays, or any other package that includes a flexible laminate. Thus, although the example depicted in FIG. 1 is of a flexible package enclosing a tray for holding the product, it is understood that various types of other packaging structures that include a flexible packaging component may include the laminated structure and features described herein. In addition, it is noted that although the terms "upper," "lower," "left," "right," "front," "rear," "top," and "bottom" may be used in the description herein to refer to certain parts of the depicted package, such terms are used for ease of explanation only and are not absolute. Thus, it is recognized that the depicted package, for example, may be flipped over, turned around, etc., and as a result the "bottom side" may be at the top of the package and the "top side" may be at the bottom of the package, etc.

Turning now to FIG. 1, a package 10 formed using a laminate structure 1 is illustrated according to an example embodiment of the invention. The package 10 may be opened by peeling the laminate structure 1 so as to provide access to any product stored within the package 10. The third film layer 6 (e.g., the top or outermost film layer) of the laminate structure 1 may be gripped and peeled with force F by a consumer, and the other film layers, including the first film layer 2, may move with the third film layer 6 to create an opening 31 through which the package contents may be accessed, as better illustrated in FIG. 4 and discussed in more detail below.

Figure 2:
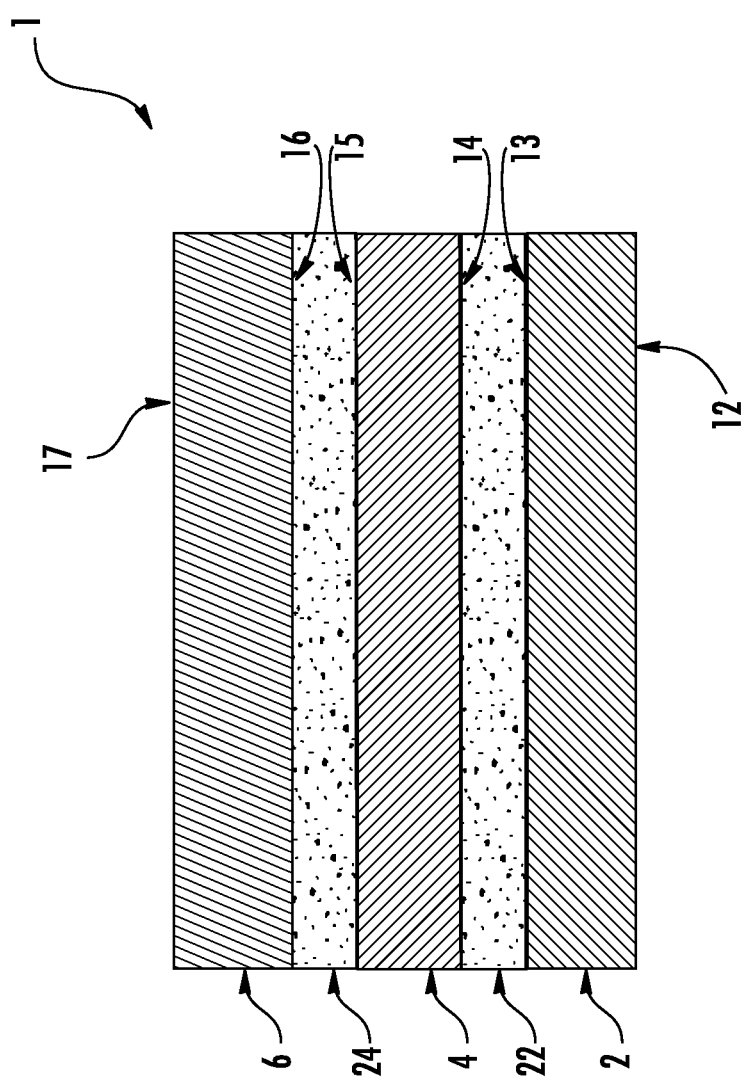
FIG. 2 is an enlarged schematic cross-sectional view of the laminate structure for forming the package of FIG. 1 prior to scoring according to an example embodiment of the invention.

With reference to FIG. 2, the laminate structure 1 for forming the package 10 of FIG. 1 prior to scoring is illustrated according to an example embodiment of the invention. The laminate structure 1 may include a first film layer 2, a second film layer 4, and a third film layer 6. The first film layer 2 may define a first surface 12 and a second surface 13 opposite the first surface 12. The second film layer 4 may define a first surface 14 laminated to the second surface 13 of the first film layer 2, such as, for example, by a permanent adhesive 22. The second film layer 4 may also define a second surface 15 opposite the first surface 14 of the second film layer 4. The third film layer 6 may define a first surface 16 laminated to the second surface 15 of the second film layer 4, such as, for example, by a pressure sensitive adhesive 24 ("PSA"). The third film layer 6 may also define a second surface 17 opposite the first surface 16 of the third film layer 6.

In certain embodiments described herein, for instance, the first film layer 2 may comprise a polyethylene. For example, the first film layer 2 may comprise high density polyethylene ("HDPE"), low density polyethylene ("LDPE"), or medium density polyethylene ("MDPE"). However, in other exemplary embodiments, the first film layer 2 may comprise a polyester, a polypropylene, or a polyamide (e.g., a nylon).

The second film layer 4, for example, may comprise a polyester (e.g., PET), a polypropylene (e.g., OPP), or a polyamide (e.g., a nylon). For instance, in certain exemplary embodiments, the second film layer 4 may comprise polyethylene terephthalate ("PET"), oriented polypropylene ("OPP"), or any combination thereof. According to certain embodiments, the material of the second film layer 4 (e.g., PET, OPP, or combinations thereof) may be metallized. In this regard, the second film layer 4 may comprise PET, OPP, metallized PET, metallized OPP, or some combination thereof. If the second film layer 4 comprises PET or a polyamide, the first film layer 2 may comprise OPP or a polyethylene. However, if the second film layer 4 comprises OPP, the first film layer 2 may comprise polyethylene.

In some embodiments, at least the second film layer 4 may comprise a barrier layer. The barrier layer may serve as a barrier to the passage of oxygen and/or moisture vapor through the laminate structure 1, such that the product inside the package is protected against infiltration of oxygen (which leads to more rapid product spoilage) and/or so that moisture in the product (in the case of a moist product such as a cheese) is prevented from escaping through the package material (which leads to more rapid drying out of the product). Examples of suitable barrier materials include ethylene vinyl alcohol copolymer (EVOH), polyvinylidene chloride (PVDC), polyvinyl alcohol (PVOH), aluminum oxide coated PET (ALOx), nanocoated materials, metallized PET, metallized OPP, and the like.

The third film layer 6, for instance, may comprise a polyester (e.g., PET), a polypropylene (e.g., OPP), or a polyamide (e.g., a nylon). For example, in certain exemplary embodiments, the third film layer 6 may comprise PET, OPP, or any combination thereof. Moreover, the third film layer 6 may comprise a print web material. For example, text, images, etc. may be printed on the material of the third film layer 6.

As previously mentioned, the second film layer 4 may be laminated to the first film layer 2, for example, via a permanent adhesive 22. The permanent adhesive 22 may be continuously applied (e.g., via flood-coating) or pattern applied, although a continuous permanent adhesive may provide improved contact between the first film layer 2 and the second film layer 4. In this regard, the ability of the first and second film layers 2, 4 to adhere to each other as the third film layer 6 is peeled by the consumer may be improved through the use of a permanent adhesive 22 between the first film layer 2 and the second film layer 4, thereby encouraging the first and second film layers to move together as the laminate structure 1 is pulled away from the packaging. The permanent adhesive 22 may be any permanent adhesive suitable for use in flexible packaging according to, for example, federal regulatory code 21 C.F.R. §175.105.

Moreover, as previously mentioned, the third film layer 6 may be laminated to the second film layer 4, for example, via a PSA 24. The PSA 24 may be continuously applied (e.g., via flood-coating) or pattern applied. In this regard, the PSA 24 may provide a reclosable seal for the package 10 such that a consumer may open the package and then reseal the removable portion 18 (FIG. 4) to the rest of the package to protect the products stored therein from the environment and/or maintain the product within the package. Any PSA having suitable performance requirements (e.g., peel and reseal strengths) for use in the laminate structure 1 and the package 10 as understood by one of ordinary skill in the art may be used in the laminate structure.

In certain embodiments, for instance, the permanent adhesive 22 and the PSA 24 may be pattern-applied together between two layers (e.g., between the second film layer 4 and the third film layer 6). In this regard, the PSA 24 may be pattern-applied in a particular pattern, and the permanent adhesive 22 may be pattern-applied in a pattern complementary to that of the PSA pattern. For example, in areas between the second film layer 4 and the third film layer 6 where resealing is to occur (e.g., proximate the reseal surface 23 shown in FIG. 4), PSA may be used. In other areas between the second film layer 4 and the third film layer 6, in this example, permanent adhesive may be used, such as in areas outside the removable portion 18, where it is desired that the second and third film layers remain laminated to each other. In still other cases, certain areas between the second and third film layers 4, 6 may be devoid of both permanent adhesive and PSA, such as in a pull tab region where it is desired that the user be able to separate the third film layer from the second film layer to initiate peeling of the removable portion 18.

Figure 3:
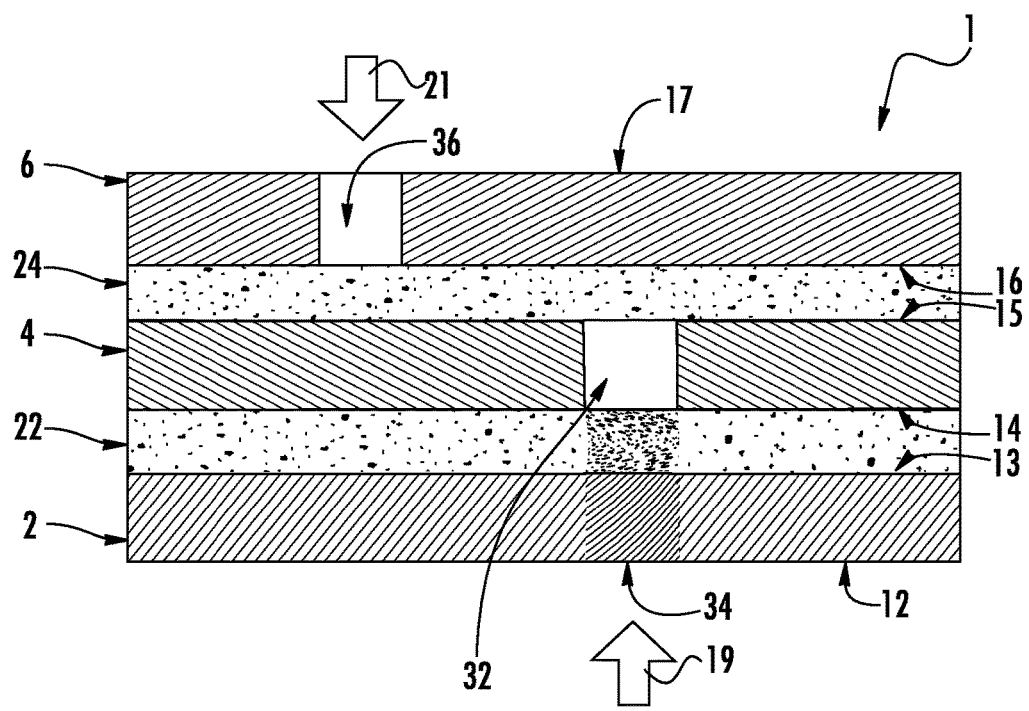
FIG. 3 is an enlarged schematic cross-sectional view of the laminate structure for forming the package of FIG. 1 after scoring according to an example embodiment of the invention.

With reference now to FIG. 3, the laminate structure 1 for forming the package 10 of FIG. 1 is illustrated after scoring according to an example embodiment of the invention. The laminate structure 1 includes an inner laser score line 32, an uncut laser-distorted region 34, and an outer score line 36. The inner laser score line 32 may extend at least between the first and second surfaces 14, 15 of the second film layer 4. As such, the inner laser score line 32 may extend between the first and second surfaces 14, 15 of the second film layer 4 as shown, or in some cases the inner laser score line 32 may extend beyond the second surface 15 of the second film layer 4 into the PSA 24. In this regard, in some embodiments, for instance, the inner laser score line 32 may extend partially into or completely through the PSA 24. The inner laser score line 32, however, may not extend into the third film layer 6.

The uncut laser-distorted region 34 may extend at least between the first and second surfaces 12, 13 of the first film layer 2 and may be formed as a result of laser-cutting the inner laser score line 32 through the first film layer 2, such as in the direction of the arrow 19 in FIG. 3, as discussed in more detail below. As such, the laser-distorted region 34 may extend between the first and second surfaces 12, 13 of the first film layer 2, or the laser-distorted region 34 may extend beyond the second surface 13 of the first film layer 2 into the permanent adhesive 22. In this regard, in some embodiments, for example, the laser-distorted region 34 may extend partially into or completely through the permanent adhesive 22. However, because the laser that creates the laser-distorted region 32 actually cuts the second film layer 4 as previously discussed, the laser-distorted region 34 does not extend into the second film layer 4.

As used herein, the terms "distort" and "distortion" generally refer to a weakening of a material and/or layer by a laser such that the material and/or layer is not cut by the laser. In this regard, the laser may alter the morphology of a film without compromising the integrity of the structure. This may result in localized changes in crystallinity, dimensions and/or appearance, but without the creation of holes, notches or physical pathways that could compromise the barrier or strength properties of the material. In particular, distortion is a result of the heat of the laser transmitting through a film layer. As such, more material will be distorted in response to increased application of energy.

The laser distorts the first film layer 2, but cuts the second film layer 4 due to the differences in the materials of the two layers 2, 4. For example, the first film layer 2 may comprise a material having properties that allow the energy of the laser to transmit through to the second film layer 4, whereas the second film layer may comprise a material having properties such that the material absorbs the energy of the laser. As such, the laser may cut the second film layer 4 while it only distorts the first film layer 2. In other embodiments, however, the first film layer 2 may be cut and the second film layer 4 may be distorted. In such embodiments, for example, excess laser energy put into the first film layer 2 would cut through the first film layer and would pass into the second film layer 4 to distort and/or weaken the second film layer 4.

Absorption and transmission are a result of the film type and laser wavelength chosen. For example, a 10.6 nm laser may pass through polypropylene and polyethylene but absorb into PET and polyamide. In addition, a 10.2 nm laser may pass through polyethylene and polyamide but absorb into PET and polypropylene. Moreover, a 9.4 nm laser (also known as a 9.3 or 9.6 nm laser) may pass through polyethylene and polypropylene but absorb into PET and polyamide. In exemplary embodiments in which the second film layer 4 is metallized, the metallized second film layer may reflect the laser.

The outer score line 36 may extend at least between the first and second surfaces 16, 17 of the third film layer 6. As such, the outer score line 36 may extend between the first and second surfaces 16, 17 of the third film layer 6 as shown, or in some cases the outer score line 36 may extend beyond the first surface 16 of the third film layer 6 into the PSA 24. In this regard, in some embodiments, for instance, the outer score line 36 may extend partially into or completely through the PSA 24, such as in the direction of the arrow 21 in FIG. 3, and, in certain embodiments, for example, even partially into the second film layer 4.

As shown in FIG. 3, the inner laser score line 32 may be in line with the laser-distorted region 34, and the outer score line 36 may be offset from the aligned inner laser score line 32 and laser distorted region 34. For example, the inner laser score line 32 may be defined along a line that is spaced from a line along which the outer laser score line 36 is defined. Moreover, in certain embodiments, for example, the inner laser score line 32 and/or the outer score line 36 may comprise a slit (e.g., a single, linear cut from which material has been removed).

The second film layer 4 and the first film layer 2 may be simultaneously laser-cut from an inner side of the laminate structure 1 (along the arrow 19) to form the resulting laser-distorted region 34 and the inner laser score line 32. For example, a laser beam may be transmitted through the material of the first film layer 2 (e.g., PE) to be absorbed by the material of the second film layer 4 (e.g., OPP), thereby cutting through the second film layer 4. In this regard, the first film layer 2 may be weakened by the laser, resulting in the laser-distorted region 34.

Similarly, in some embodiments, for example, the third film layer 6 may be laser-cut from an outer side of the laminate structure 1 (along the arrow 21) to form the outer score line 36. In such embodiments, for example, the material of the third film layer 6 (e.g., PET) may be selected such that it absorbs the laser energy, thereby cutting through the third film layer 6. However, in other embodiments, for example, the outer score line 36 may be formed in any suitable manner as understood by one of ordinary skill in the art, such as by mechanical cutting (e.g., die cutting), scoring, perforating and/or the like.

In certain embodiments, for instance, the inner laser score line 32 and optionally the outer score line 36 may be laser-cut with, by way of example only, a 10.2 nm laser, although one of ordinary skill in the art will appreciate that different laser wavelengths may be used depending on the absorption, reflection, and transmission properties of the film layers, which may be defined by the materials selected and thicknesses of those layers. Moreover, in the embodiments depicted herein, each of the inner laser score line 32 and the outer score line 36 are continuous lines that define a removable portion 18 (FIG. 1); however, in other embodiments, for instance, the outer score line 36 may be discontinuous (e.g., a series of perforations that create a continuous cut line as the consumer peels back the removable portion 18 of the laminate structure 1).

Figure 4:
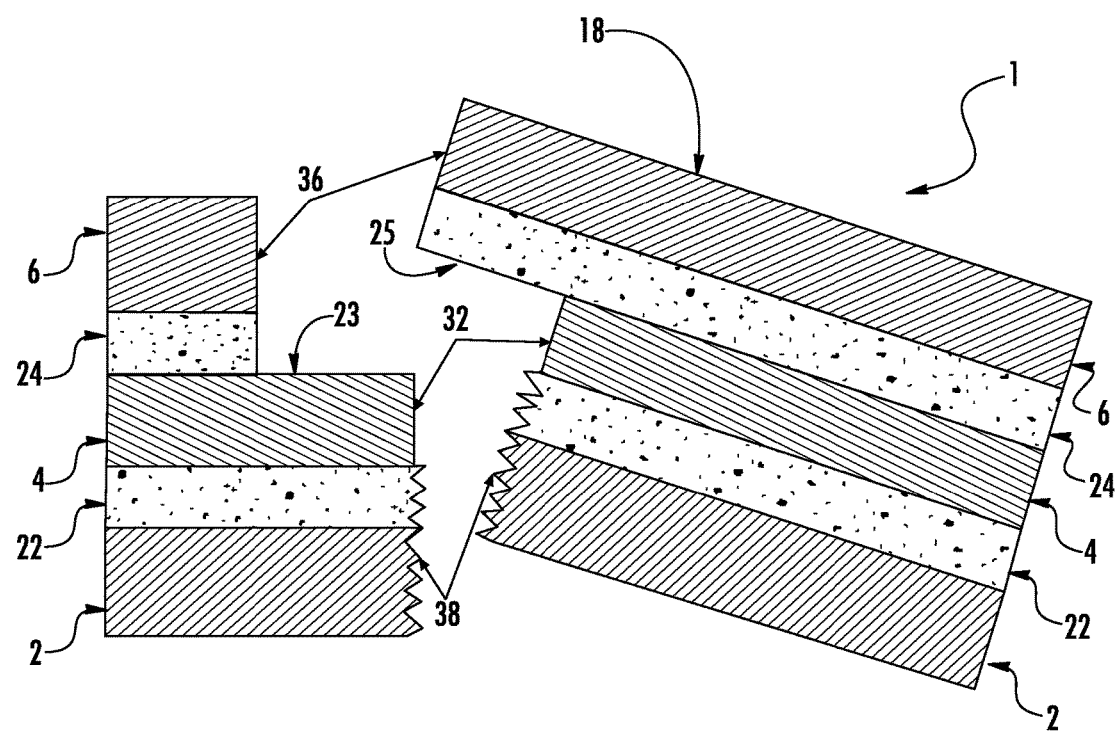
FIG. 4 is an enlarged schematic cross-sectional view of the laminate structure for forming the package of FIG. 1 in an open configuration according to an example embodiment of the invention.

In this regard, and with reference to FIG. 4, peeling back the third film layer 6 at the outer score line 36 (e.g., via a pull tab or other grippable feature formed by the removable portion 18) may cause the first film layer 2 to fail within the laser-distorted region 34 and form a cut line 38 in at least the first film layer 2. The cut line 38 may be continuous with the inner laser score line 32, such that the first film layer 2 and the second film layer 4 may be moved together with the third film layer 6 upon peeling due to the presence of the PSA 24 and the permanent adhesive 22.

For example, the permanent adhesive 22 may allow the first film layer 2 and the second film layer 4 to remain attached such that they move together upon opening. Moreover, the bond strength of the PSA 24, coupled with the presence of the inner score line 32, may cause the second film layer 4 to remain adhered to the third film layer 6 as the third film layer is peeled back, thereby creating a force within the laminate 1 that causes the uncut laser-distorted region 34 to break, which creates a cut line 38 that is coextensive with the inner score line 32. Once peeled, the outer score line 36, the inner laser score line 32, and the cut line 38 may thus provide a predefined opening for the consumer to gain access to the contents of the package, such as by pushing his or her fingers or hand through the opening and withdrawing a desired amount of product. Once the initial opening occurs, the offset positions of the inner score line 32 and the outer score line 36 may serve to create a reseal surface 23 on which a corresponding portion 25 of the removable portion 18 may be re-adhered for reclosing the package. Depending on the material selected for the third film layer 6 and/or the second film layer 4, the PSA 24 may remain adhered to the third film layer, as shown, or may remain adhered to the second film layer. Regardless, the PSA 24 in the area of the portion 25 may serve to re-adhere the removable portion 18 to the rest of the package via the reseal surface 23.

Figure 5:
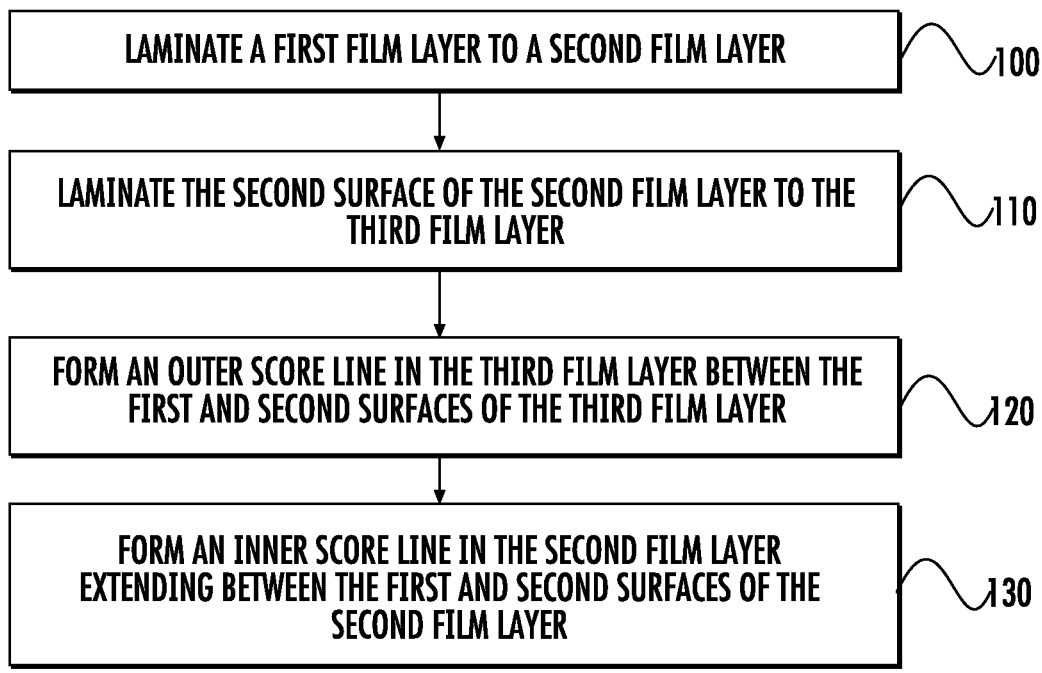
FIG. 5 is a schematic block diagram illustrating a method of manufacturing a laminate structure according to embodiments of the invention.

Embodiments of the laminate structure 1 described above may be made in various ways. With reference to FIG. 5, in some embodiments, for example, a laminate structure may be made by laminating a first film layer to a second film layer. Block 100. The first film layer may define a first surface configured to be disposed proximate a product stored within a package and a second surface opposite the first surface. In addition, the first film layer may be continuous (e.g., uncut). The second film layer may define a first surface laminated to the second surface of the first film layer and a second surface opposite the first surface of the second film layer. To laminate the first film layer to the second film layer, a permanent adhesive may be applied between the first film layer and the second film layer.

The second surface of the second film layer may be laminated to the third film layer. Block 110. The third film layer may define a first surface laminated to the second surface of the second film layer and a second surface opposite the first surface of the third film layer. To laminate the second film layer to the third film layer, a PSA may be applied between the second film layer and the third film layer.

An outer score line may be formed in the third film layer that may extend between the first and second surfaces of the third film layer. Block 120. In some embodiments, the third film layer may be laser-cut from an outer side of the laminate structure to form the outer score line (e.g., along a direction of the arrow 21 of FIG. 3).

An inner laser score line may be laser-cut in the second film layer that may extend between the first and second surfaces of the second film layer. Block 130. The inner laser score line may be made through the first film layer (e.g., along a direction of the arrow 19 of FIG. 3) such that laser-cutting the inner laser score line creates a laser-distorted region in the first film layer through which the laser passes. The inner laser score line may be in line with the laser-distorted region, and the outer score line may be offset from the inner laser score line and the laser-distorted region, as described above. In this regard, peeling back the third film layer via the outer score line may cause the first film layer to break along the laser-distorted region to form a cut line in at least the first film layer. The cut line may be continuous with the inner laser score line, such that the first film layer and the second film layer may be moved together with the third film layer upon peeling, as described above.

Embodiments of the package, laminate structure, and method described above provide laminate structures including a continuous, uncut film that tears in a predetermined, controlled manner due to the positioning and laser-cutting of score lines, such that the laminate structure provides a hermetic seal prior to opening the package and easy open/reclose functionality after opening the package. For example, the methods described are thus configured to provide a laminate structure in which an outer film layer is cut from an outer side of the laminate structure, and a center film layer is laser-cut from an inner side of the laminate structure through an inner film layer, which is weakened and/or distorted by the laser to create laminate structures for forming packages that are hermetically sealed (e.g., due to the continuous film) and are resealable or reclosable (e.g., due to the layered structure having PSA).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A package formed using a laminate structure, the laminate structure comprising:
   a first film layer defining a first surface configured to be disposed proximate a product stored within a package, the first film layer further defining a second surface opposite the first surface, wherein the first film layer includes an uncut laser-distorted region;
   a second film layer defining a first surface laminated to the second surface of the first film layer and a second surface opposite the first surface of the second film layer, wherein the second film layer includes an inner laser score line extending between the first and second surfaces of the second film layer; and
   a third film layer defining a first surface laminated to the second surface of the second film layer and a second surface opposite the first surface of the third film layer, wherein the third film layer includes an outer score line extending between the first and second surfaces of the third film layer,
   wherein the inner laser score line is in line with the laser-distorted region, and the outer score line is offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer.

2. The package of claim 1, wherein the outer score line comprises an outer laser score line.

3. The package of claim 1, wherein the second film layer is laminated to the first film layer via a permanent adhesive.

4. The package of claim 1, wherein the third film layer is laminated to the second film layer via a pressure sensitive adhesive.

5. The package of claim 1, wherein the first film layer comprises a polyethylene.

6. The package of claim 1, wherein the second film layer comprises a polyethylene terephthalate (PET), an oriented polypropylene (OPP), or any combination thereof.

7. The package of claim 6, wherein the PET, the OPP, or any combination thereof is metallized.

8. The package of claim 1, wherein the third film layer comprises a PET, an OPP, or any combination thereof.

9. A laminate structure for forming a package, the laminate structure comprising:

a first film layer defining a first surface configured to be disposed proximate a product stored within a package, the first film layer further defining a second surface opposite the first surface, wherein the first film layer includes an uncut laser-distorted region;

a second film layer defining a first surface laminated to the second surface of the first film layer and a second surface opposite the first surface of the second film layer, wherein the second film layer includes an inner laser score line extending between the first and second surfaces of the second film layer; and a third film layer defining a first surface laminated to the second surface of the second film layer and a second surface opposite the first surface of the third film layer, wherein the third film layer includes an outer score line extending between the first and second surfaces of the third film layer, wherein the inner laser score line is in line with the laser-distorted region, and the outer score line is offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer.

10. The laminate structure of claim 9, wherein the outer score line comprises an outer laser score line.

11. The laminate structure of claim 9, wherein the second film layer is laminated to the first film layer via a permanent adhesive.

12. The laminate structure of claim 9, wherein the third film layer is laminated to the second film layer via a pressure sensitive adhesive.

13. The laminate structure of claim 9, wherein the first film layer comprises a polyethylene.

14. The laminate structure of claim 9, wherein the second film layer comprises a polyethylene terephthalate (PET), an oriented polypropylene (OPP), or any combination thereof.

15. The laminate structure of claim 14, wherein the PET, the OPP, or any combination thereof is metallized.

16. The laminate structure of claim 9, wherein the third film layer comprises a PET, an OPP, or any combination thereof.

17. A method of manufacturing a laminate structure for forming a package, the method comprising:

laminating a first film layer to a second film layer, wherein:

the first film layer defines a first surface configured to be disposed proximate a product stored within a package, the first film layer further defining a second surface opposite the first surface, the first film layer being continuous, and the second film layer defines a first surface laminated to the second surface of the first film layer and a second surface opposite the first surface of the second film layer;

laminating the second surface of the second film layer to the third film layer, wherein the third film layer defines a first surface laminated to the second surface of the second film layer and a second surface opposite the first surface of the third film layer;

forming an outer score line in the third film layer extending between the first and second surfaces of the third film layer; and laser-cutting an inner laser score line in the second film layer extending between the first and second surfaces of the second film layer;

wherein the inner laser score line is made through the first film layer, wherein laser-cutting the inner laser score line creates a laser-distorted region in the first film layer, and wherein the inner laser score line is in line with the laser-distorted region, and the outer score line is offset from the inner laser score line and the laser-distorted region, such that peeling back the third film layer at the outer score line causes the first film layer to break along the laser-distorted region to form a first film layer cut line continuous with the inner laser score line to allow the first film layer and the second film layer to be moved together with the third film layer.

18. The method of claim 17, wherein forming the outer score line in the third film layer comprises laser-cutting the third film layer from an outer side of the laminate structure to form the outer score line.

19. The method of claim 17, wherein laminating the first film layer to the second film layer comprises applying a permanent adhesive between the first film layer and the second film layer.

20. The method of claim 17, wherein laminating the second film layer to the third film layer comprises applying a pressure sensitive adhesive between the second film layer and the third film layer.

* * * * *